United States Patent
Krajisnik

(10) Patent No.: US 9,973,663 B2
(45) Date of Patent: May 15, 2018

(54) SYSTEMS AND METHODS FOR SELF-CLEANING CAMERA

(71) Applicant: GM GLOBAL TECHNOLOGY OPERATIONS LLC, Detroit, MI (US)

(72) Inventor: Aljosa Krajisnik, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 829 days.

(21) Appl. No.: 14/278,285

(22) Filed: May 15, 2014

(65) Prior Publication Data

US 2015/0329088 A1   Nov. 19, 2015

(51) Int. Cl.
| | |
|---|---|
| *B60S 1/56* | (2006.01) |
| *H04N 5/225* | (2006.01) |
| *B60S 1/52* | (2006.01) |
| *B60R 1/00* | (2006.01) |
| *H04N 5/232* | (2006.01) |
| *G03B 17/08* | (2006.01) |
| *G03B 17/56* | (2006.01) |

(52) U.S. Cl.
CPC .............. *H04N 5/2251* (2013.01); *B60R 1/00* (2013.01); *B60S 1/52* (2013.01); *B60S 1/56* (2013.01); *G03B 17/08* (2013.01); *G03B 17/56* (2013.01); *H04N 5/2252* (2013.01); *H04N 5/23203* (2013.01); *B60R 2300/10* (2013.01); *B60R 2300/802* (2013.01)

(58) Field of Classification Search
CPC . B08B 3/02; B60S 1/0848; B60S 1/56; B60R 11/04; H04N 5/225; H04N 5/2252; G03B 17/02
See application file for complete search history.

(56) References Cited

U.S. PATENT DOCUMENTS

| | | | |
|---|---|---|---|
| 6,527,000 B1* | 3/2003 | Randmae | B08B 3/024 134/102.1 |
| 2005/0174883 A1* | 8/2005 | Haughton | B01F 11/0082 366/332 |
| 2006/0232670 A1 | 10/2006 | Chu | |
| 2011/0292212 A1 | 12/2011 | Tanabe et al. | |

(Continued)

FOREIGN PATENT DOCUMENTS

| | | |
|---|---|---|
| CN | 201432644 Y | 3/2010 |
| CN | 102639363 A | 8/2012 |

(Continued)

OTHER PUBLICATIONS

DE102008008656—Machine Translation, Aug. 2009.*

(Continued)

*Primary Examiner* — Marc Lorenzi
(74) *Attorney, Agent, or Firm* — Lorenz & Kopf, LLP

(57) ABSTRACT

Methods and systems are provided for a self-cleaning camera. The system includes a camera including a lens and a housing surrounding the lens. The system includes a shroud coupled to the housing about the lens. The shroud includes at least one anchor point for coupling the shroud to a vehicle. The system also includes a motor coupled to the housing of the camera via a coupling system such that an activation of the motor moves the camera relative to the shroud, and the movement of the camera relative to the shroud assists in cleaning the lens of the camera.

5 Claims, 4 Drawing Sheets

(56) References Cited

U.S. PATENT DOCUMENTS

| | | | | |
|---|---|---|---|---|
| 2012/0117745 A1* | 5/2012 | Hattori | ............... | B60S 1/0848 |
| | | | | 15/250.01 |
| 2013/0010115 A1* | 1/2013 | Jerusalem | ............... | B60S 1/56 |
| | | | | 348/148 |
| 2015/0185592 A1* | 7/2015 | Eineren | ............... | G03B 17/02 |
| | | | | 348/375 |
| 2015/0246660 A1* | 9/2015 | Seedall | ............... | B60S 1/26 |
| | | | | 359/507 |
| 2015/0274090 A1* | 10/2015 | Buschmann | ............ | B60R 11/04 |
| | | | | 224/567 |

FOREIGN PATENT DOCUMENTS

| | | | | | |
|---|---|---|---|---|---|
| CN | 103043035 | A | | 4/2013 | |
| DE | 102008008656 | A1 | * | 8/2009 | ............... B60R 1/00 |
| DE | 102013111224 | A1 | * | 4/2014 | ............. B60R 11/04 |
| WO | 2014057070 | A1 | | 4/2014 | |

OTHER PUBLICATIONS

Tan, Jonathan J., "Nissan Note's Self-Cleaning Rear-View Cam Explained," published on Jun. 13, 2013 and accessed on Aug. 13, 2014 from http://paultan.org/2013/06/13/nissan-note-self-cleaning-camera/.pdf.

State Intellectual Property Office of the Peoples Republic of China, Office Action in Chinese Jatent Application No. 201510247426.1 dated Sep. 22, 2017.

* cited by examiner

SYSTEMS AND METHODS FOR SELF-CLEANING CAMERA

TECHNICAL FIELD

The present disclosure generally relates to vehicles and more particularly relates to systems and methods for a self-cleaning camera for a vehicle.

BACKGROUND

Certain vehicles include a rear vision camera that provides images of an area surrounding a rear of the vehicle, such as when the vehicle is in moving in reverse. In certain instances, a lens of the camera may become obstructed by dirt and other debris. The obstruction of the lens of the camera by dirt and debris may impair image quality.

Accordingly, it is desirable to provide improved systems and methods for a self-cleaning camera, such as a rear vision camera, to enable the removal of dirt and debris from the camera lens to ensure suitable image quality from the camera. Furthermore, other desirable features and characteristics of the present invention will become apparent from the subsequent detailed description and the appended claims, taken in conjunction with the accompanying drawings and the foregoing technical field and background.

SUMMARY

In one embodiment, a self-cleaning camera is provided. The system includes a camera including a lens and a housing surrounding the lens. The system also includes a shroud coupled to the housing about the lens. The shroud includes at least one anchor point adapted to couple the shroud to a vehicle. The system also includes a motor coupled to the housing of the camera via a coupling system such that an activation of the motor moves the camera relative to the shroud, and the movement of the camera relative to the shroud assists in cleaning the lens of the camera.

In one embodiment, a method is provided for cleaning a camera system of a vehicle. The method includes receiving user input data requesting cleaning of a camera associated with vehicle and outputting one or more first control signals to a fluid system adjacent to the camera to dispense a cleaning fluid on a portion of the camera based onto the user input data. The method also includes outputting one or more second control signals to a motor coupled to the camera to move the camera based on the user input data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
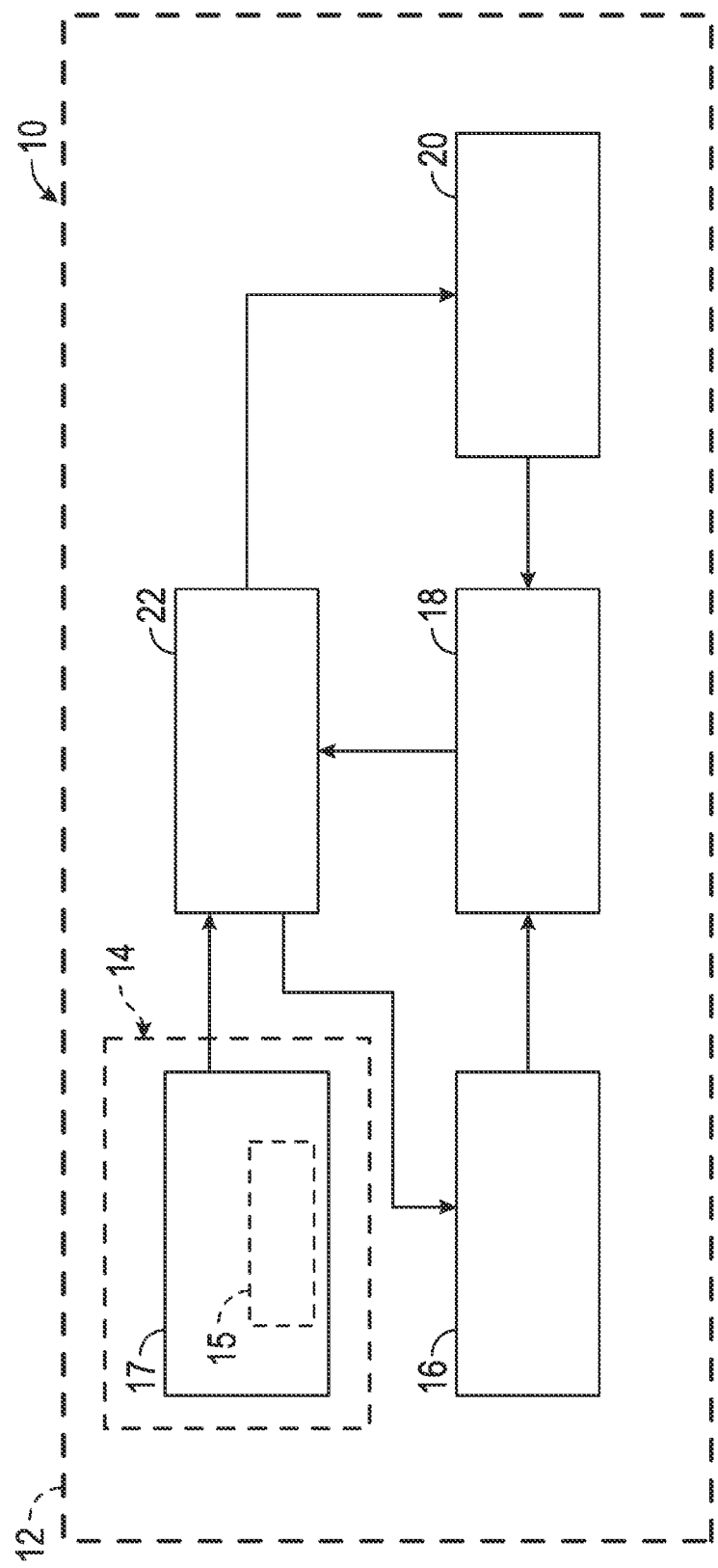
FIG. 1 is a functional block diagram illustrating a vehicle that includes a self-cleaning camera system in accordance with various embodiments.

With reference to FIG. 1, a vehicle 10 including a self-cleaning camera system 12 is illustrated. In one example, the self-cleaning camera system 12 includes a human-machine interface 14, a motor 16, an imaging device or camera 18, a fluid system 20 and a control module 22. As will be discussed in further detail herein, in one example, upon receipt of user input to the human-machine interface 14, the control module 22 generates one or more control signals for the motor 16 such that the motor 16 moves at least a portion of the camera 18. The control module 22 also generates one or more control signals to activate the fluid system 20 such that fluid is dispensed or sprayed onto at least a portion of the camera 18. The movement of the camera 18 during the spraying or application of the fluid from the fluid system 20 enables the removal of dirt and debris from at least a portion of the camera 18. Although the figures shown herein depict an example with certain arrangements of elements, additional intervening elements, devices, features, or components may be present in an actual embodiment. It should also be understood that FIG. 1 is merely illustrative and may not be drawn to scale.

With continued reference to FIG. 1, the human-machine interface 14 enables the operator or an occupant of the vehicle 10 to interface with the self-cleaning camera system 12 of the vehicle 10. The human-machine interface 14 is associated with a user input device 15 and a display 17. The user input device 15 is any suitable device capable of receiving user input, including, but not limited to, a keyboard, one or more knobs, one or more buttons, one or more sliders, a camera with gesture recognition capabilities, a microphone, a touchscreen layer associated with the display 17, or other suitable device to receive data and/or commands from the user. Of course, multiple user input devices 15 can also be utilized. The display 17 comprises any suitable technology for displaying information, including, but not limited to, a liquid crystal display (LCD), organic light emitting diode (OLED), plasma, or a cathode ray tube (CRT). The user input received by the user input device 15 enables the user to activate the self-cleaning camera system 12 to remove dirt or debris from at least a portion of the camera 18, as will be discussed in greater detail herein. It should also be noted that the user input device 15 and display 17 can be implemented as part of an infotainment system or other system associated with the vehicle 10.

Figure 2:
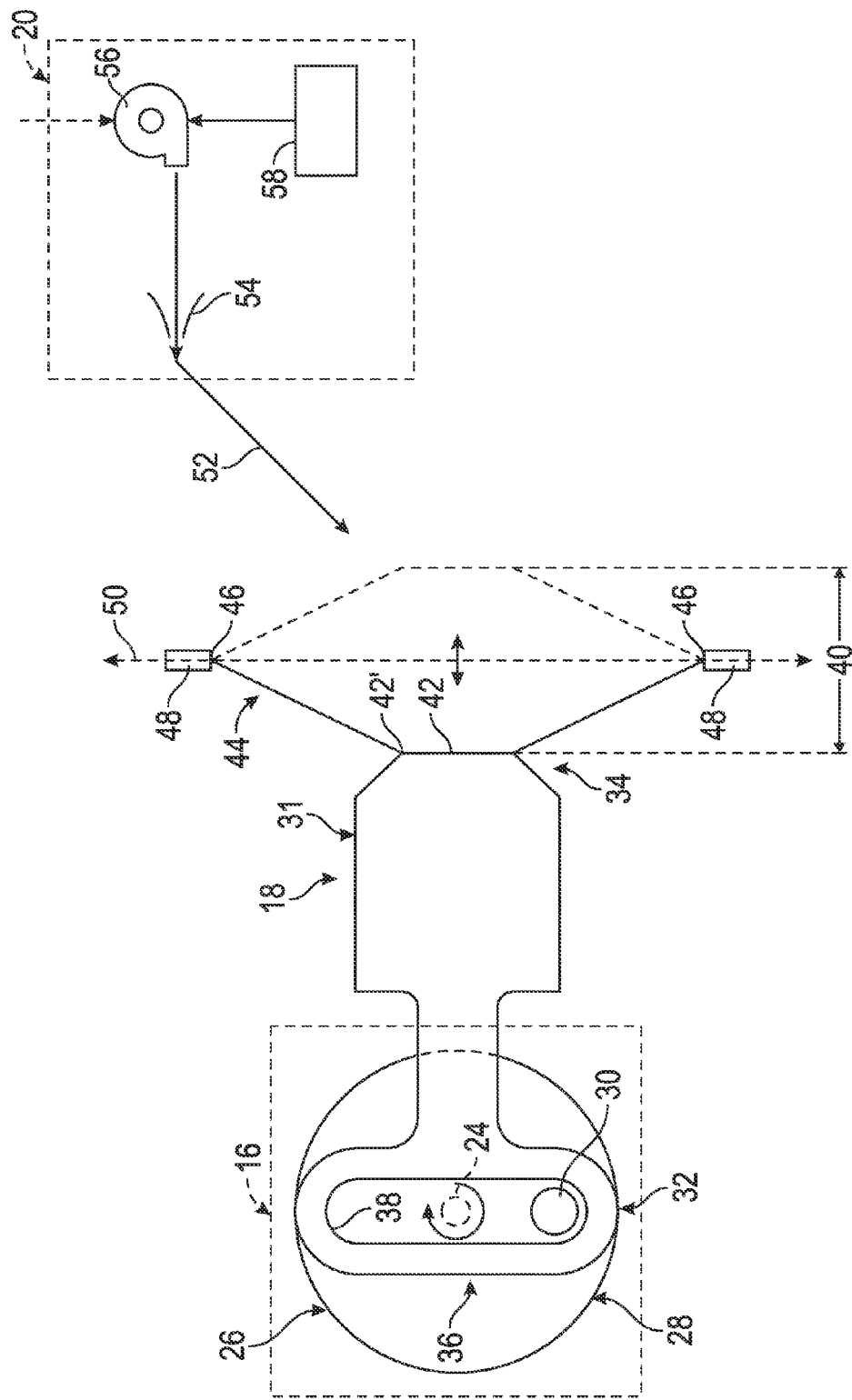
FIG. 2 is a side view schematic illustration of an exemplary self-cleaning camera.

The motor 16 comprises any suitable device capable of driving a portion of the camera 18 such that at least a portion of the camera 18 moves relative to the vehicle 10, as will be discussed further herein. In one example, the motor 16 comprises a direct current (DC) motor; however, any suitable motor could be employed, such as an alternating current (AC) motor. With reference to FIG. 2, the motor 16 includes an output shaft 24, which is coupled to a coupling system 26. As will be discussed herein, the coupling system 26 couples the output shaft 24 of the motor 16 to the camera 18 to enable reciprocal translational movement of at least a portion of the camera 18. In one example, the coupling system 26 includes an annular plate 28 coupled to the output shaft 24. The annular plate 28 is coupled to the output shaft 24 on a first side so as to be movable or rotatable with the movement or rotation of the output shaft 24. The annular plate 28 includes a pin 30 on a second side of the annular plate 28, the first side of the annular plate 28 opposite the second side. The pin 30 is coupled to or formed on the annular plate 28 so as to be near a periphery of the annular plate 28. Generally, the pin 30 is cylindrical; however, the pin 30 can have any desired shape to couple the pin 30 to a portion of the camera 18. It should be noted that the coupling system 26 described herein is merely exemplary, as the coupling system 26 can comprise any suitable system capable of coupling rotational output of the output shaft 24 of the motor 16 to the camera 18 to enable reciprocal translational movement of the camera 18. For example, the coupling system could comprise a rack and pinion system.

As will be discussed further herein, upon the receipt of the one or more control signals from the control module 22, the motor 16 is activated such that the output shaft 24 drives or moves the annular plate 28, which rotates the annular plate 28, and thus, the pin 30. In this regard, in one example, the control module 22 supplies the motor 16 with power or a direct current to activate the motor 16. Alternatively, however, a separate power source, such as a separate DC current source, can be communicatively coupled to the motor 16 and the control module 22 such that the power source receives the one or more control signals from the control module 22 and supplies the motor 16 with power or a direct current based on the one or more control signals from the control module 22.

With continued reference to FIG. 2, the camera 18 is coupled to the pin 30 of the annular plate 28 of the coupling system 26. The camera 18 includes a housing 31 having a first end 32 opposite a second end 34. The housing 31 can enclose the image data generating and transmission systems associated with the camera 18 as known to one skilled in the art. Generally, as the camera 18 can comprise any suitable video camera 18 capable of generating image data, such as an image data stream, and transmitting the image data stream to the control module 22 for display on the display 17, the camera 18 will not be discussed in great detail herein.

In one embodiment, the first end 32 of the housing 31 includes a complementary coupling device for coupling the camera 18 to the coupling system 26 to enable reciprocal translational movement of the camera 18. In one example, the first end 32 includes a sliding yoke 36. The sliding yoke 36 has a slot 38, which is sized and shaped to receive the pin 30. The sliding yoke 36 can be directly coupled to the housing 31 of the camera 18, or may be formed with the housing 31 of the camera 18. Thus, the illustration of the sliding yoke 36 being integral with the housing 31 of the camera 18 in FIG. 2 is merely exemplary.

Figure 3:
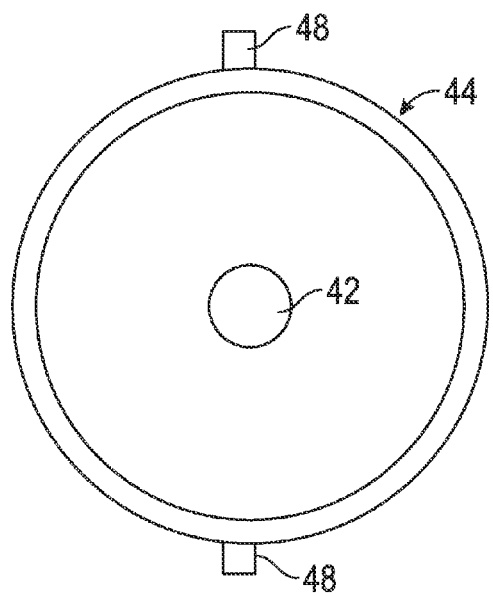
FIG. 3 is a front view illustration of the camera of FIG. 2.

The second end 34 of the housing 31 of the camera 18 surrounds a lens 42 of the camera 18. As is generally known, the lens 42 forms the viewing aperture for the image captured by the camera 18. A shroud 44 is coupled to the second end 34 of the housing 31. Generally, the shroud 44 is coupled about the lens 42, and in one example, the shroud 44 is directly coupled to the housing 31 about a perimeter or circumference of the lens 42. In one example, the shroud 44 is coupled such that the lens 42 is flush with at least a portion of the shroud 44. Generally, the shroud 44 is fixedly coupled to the camera 18 such that at least a portion of the shroud 44 moves with the movement of the camera 18. As illustrated in FIG. 3, the shroud 44 is substantially annular, however, the shroud 44 can have any desired shape. The shroud 44 may be composed of any suitable material, including, but not limited to, a flexible material, such as a flexible polymeric material, for example, a rubber.

With reference back to FIG. 2, the shroud 44 is coupled to the vehicle 10 via at least one anchor point 46. In one example, the shroud 44 includes two anchor points 46, spaced substantially opposite each other on the perimeter or circumference of the shroud 44. The anchor points 46 can comprise any suitable mechanical coupling device capable of fixedly coupling the shroud 44 to the vehicle 10 at the anchor points 46. For example, the anchor points 46 can comprise an aperture for receipt of a threaded fastener to couple the shroud 44 to brackets 48 of a body of the vehicle 10. However, the anchor points 46 can also receive an adhesive to couple the shroud 44 to the brackets 48 of the vehicle 10. Thus, generally, any suitable coupling device can be employed to couple the shroud 44 to the brackets 48 of the vehicle 10 at the anchor points 46. Furthermore, the use of brackets 48 is merely exemplary, as any suitable portion of a body of the vehicle 10 can be used to fix the shroud 44 to the vehicle 10 by the anchor points 46. By coupling the anchor points 46 to a fixed point on the vehicle 10, the movement of the shroud 44 can be used in conjunction with the application of fluid to remove dirt and debris from the lens 42 of the camera 18.

In this regard, the sliding yoke 36 in combination with the pin 30 and annular plate 28 cooperate to form a scotch-yoke arrangement for moving the camera 18. Generally, when driven by the output shaft 24 of the motor 16, the scotch-yoke arrangement between the coupling system 26 and the sliding yoke 36 results in a substantially pure sine wave motion over time given a substantially constant speed of the annular plate 28. In other words, the scotch-yoke arrangement results in a periodic or reciprocating translational movement of the camera 18. Generally, the scotch-yoke arrangement between the camera 18 and the motor 16 results in a high amplitude displacement, such as a maximum displacement 40 of about 1 inch, and a low frequency, such as about 20 Hertz (Hz) to about 200 Hz, movement of the camera 18. The reciprocal translational movement of the camera 18 relative to the shroud 44 causes the shroud 44 to move or flex on either side of a centerline 50 defined through the anchor points 46. This movement of the shroud 44 serves to aide in the movement of the fluid from the fluid system 20 over the lens 42 to clean the lens 42.

With reference to FIGS. 1 and 2, the fluid system 20 is any suitable supply of a cleaning fluid 52, including, but not limited to, washer fluid. The fluid system 20 is coupled to the vehicle 10 and generally positioned adjacent to the camera 18 so as to be able to deliver the cleaning fluid 52 onto a portion of the camera 18. In one example, the fluid system 20 includes a nozzle 54, which enables the fluid system 20 deliver a pressurized stream of the cleaning fluid 52 onto a portion of the shroud 44 and/or lens 42. Generally, the fluid system 20 is coupled to the vehicle 10 such that the cleaning fluid 52 is delivered onto at least the lens 42, and in one example, the cleaning fluid 52 may be delivered at the point where the shroud 44 meets the lens 42 at a top or uppermost portion 42' of the lens 42 (FIG. 2).

The nozzle 54 is generally downstream from a pump 56, which is in communication with a reservoir 58 that contains a quantity of the cleaning fluid 52. As will be discussed, the pump 56 receives one or more control signals from the control module 22 to activate the pump 56. The activation of the pump 56 draws cleaning fluid 52 from the reservoir 58, and the cleaning fluid 52 is directed out through the nozzle 54 of the fluid system 20. It should be noted that the illustration of the arrangement of the fluid system 20 in FIG. 2 is merely exemplary, and further, that the fluid system 20 may include other components, such as additional pumps, piping, valves, reservoirs, etc. not shown herein but known to one skilled in the art. It should also be noted that in this example, the control module 22 supplies the pump 56 with power to activate the pump 56. Alternatively, however, a separate power source can be communicatively coupled to the pump 56 and the control module 22 such that the power source receives the one or more control signals from the control module 22 and supplies the pump 56 with power based on the one or more control signals from the control module 22.

In various embodiments, the control module 22 controls the motor 16 and the pump 56 of the fluid system 20 of the self-cleaning camera system 12 based on one or more of the inputs received from the human-machine interface 14 and inputs received from other modules associated with the vehicle 10 and methods of the present disclosure. Generally, the control module 22 is in communication with the human-machine interface 14, motor 16, camera 18 and fluid system 20 over an interconnection architecture, or arrangement that facilitates transfer of data, commands, power, etc., including, but not limited to, a bus. In one example, the control module 22 generates one or more first control signals to activate the pump 56 of the fluid system 20 to dispense cleaning fluid 52 towards a portion of the shroud 44 of the camera 18 based on the receipt of user input from the user input device 15. The control module 22 also generates one or more second control signals to activate the motor 16 to move the camera 18 based on the receipt of user input from the user input device 15. In addition, the control module 22 may generate one or more control signals to activate the motor 16 and the pump 56 based on an image quality of image data received from the camera 18.

Figure 4:
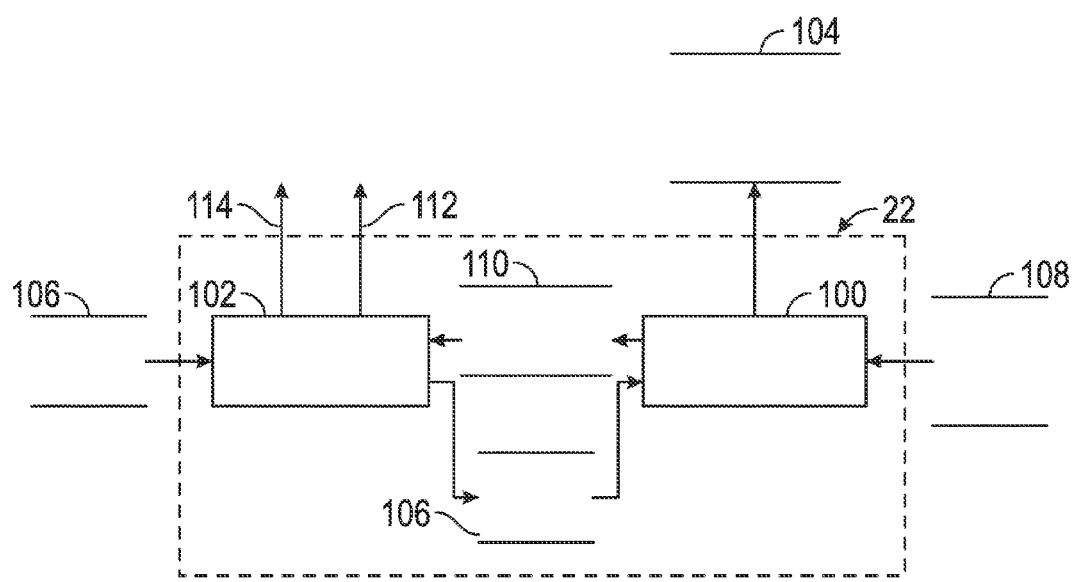
FIG. 4 is a dataflow diagram illustrating a control system of the self-cleaning camera system in accordance with various embodiments.

Referring now to FIG. 4 and with continued reference to FIGS. 1-3, a dataflow diagram illustrates various embodiments of the control module 22 of the self-cleaning camera system 12. Various embodiments of the control module 22 according to the present disclosure can include any number of sub-modules embedded within the control module 22. As can be appreciated, the sub-modules shown in FIG. 4 can be combined and/or further partitioned to similarly generate control signals to the motor 16 and pump 56 of the fluid system 20. Inputs to the control module 22 may be sensed from the vehicle 10 (FIG. 1), received from other control modules (not shown) within the vehicle 10, and/or determined/modeled by other sub-modules (not shown) within the control module 22. In various embodiments, the control module 22 includes a user interface (UI) control module 100 and a camera control module 102.

The UI control module 100 generates user interface data 104 that may be used by the display 17 to display a user interface of the human-machine interface 14 (FIG. 1) that includes image data 106 from the camera 18. The image data 106 comprises images obtained from the camera 18, and thus, may comprise a stream of image data. The UI control module 100 receives as input user input data 108 based on a user's interaction with the human-machine interface 14 (FIG. 1), such as the user's interaction with the user input device 15. The user input data 108 comprises a request to activate the motor 16 and pump 56 to clean the lens 42 of the camera 18. The UI control module 100 interprets and provides the user input data 108 as activation data 110 for the camera control module 102.

The camera control module 102 receives as input activation data 110, along with image data 106. The activation data 110 comprises a request to activate the motor 16 and pump 56. Based on the activation data 110, the camera control module 102 outputs one or more first control signals 112 to the pump 56 of the fluid system 20 and substantially simultaneously outputs one or more second control signals 114 to the motor 16. In addition, the camera control module 102 may output the one or more control signals 114 to the motor 16 and substantially simultaneously output the one or more control signals 112 to the pump 56 of the fluid system 20 based on the image data 106. In this regard, if the camera control module 102 determines that the quality of the image data 106 is poor, the camera control module 102 outputs one or more control signals 114 to the motor 16 and substantially simultaneously outputs one or more control signals 112 to the pump 56 of the fluid system 20 to clean the lens 42 to improve image quality from the camera 18.

Figure 5:
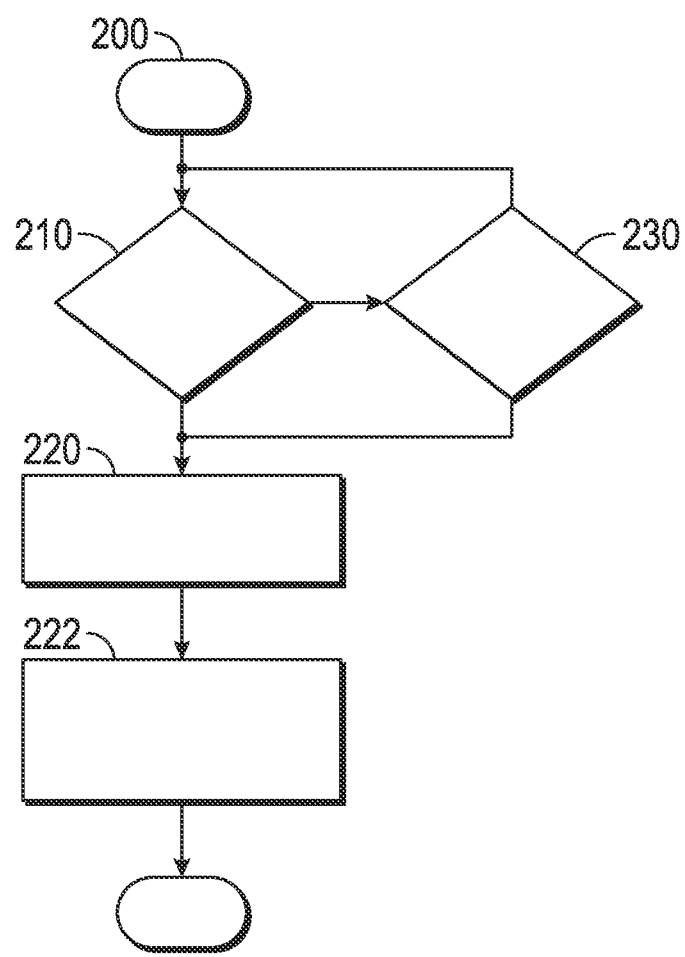
FIG. 5 is a flowchart illustrating a control method of the self-cleaning camera system in accordance with various embodiments.

Referring now to FIG. 5, and with continued reference to FIGS. 1-4, a flowchart illustrates a control method that can be performed by the control module 22 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. As can further be appreciated, one or more steps of the method may be added or removed without altering the spirit of the method.

The method may begin at 200. Generally, the method runs substantially continuously during the operation of the vehicle 10; however, the method may run during predefined time periods or predefined operating modes, such as when a transmission associated with the vehicle 10 is a reverse range (e.g. the vehicle 10 is reversing).

At 210, the method determines user input has been received at the human-machine interface 14 to clean the lens 42 of the camera 18. If true, the method goes to 220. Otherwise, at 230, the method determines if the image quality of the image data 106 received from the camera 18 is poor or below a predefined threshold for image quality from the camera 18. If the image quality is poor, the method goes to 220. Otherwise, the method loops to 210.

At 220, the method outputs one or more second control signals 114 to the motor 16 to activate the motor 16 to move the camera 18 in a reciprocating translational motion relative to the vehicle 10. At 222, the method outputs the one or more first control signals 112 to the pump 56 of the fluid system 20 to activate the pump 56 to dispense cleaning fluid 52 from the fluid system 20 onto at least a portion of the camera 18. It should be noted that although 220 and 222 are illustrated herein as being sequential, 220 and 222 are generally performed substantially simultaneously. The method ends at 224.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A self-cleaning camera system for a vehicle, comprising:
   a camera including a lens and a housing surrounding the lens;
   a shroud coupled to the housing about the lens, the shroud including two anchor points spaced opposite each other on a perimeter of the shroud that fixedly couple the shroud to the vehicle, with a centerline defined through the anchor points;
   a motor coupled to the housing of the camera via a coupling system and an activation of the motor moves the camera relative to the shroud, which is fixedly coupled to the vehicle via the two anchor points, in a reciprocal translational movement such that the shroud and the lens translate through the centerline and reciprocate on opposite sides of the centerline, and the movement of the camera relative to the shroud assists in cleaning the lens of the camera;
   a fluid system that dispenses a cleaning fluid onto at least one of a portion of the shroud and the lens to clean the camera during the reciprocal translational movement of the camera; and
   a control module, having a processor, that receives as input a request to activate the motor and the fluid system to clean the camera, and based on the input, the control module outputs one or more first control signals to the fluid system to activate the fluid system to dispense the cleaning fluid and outputs one or more second control signals to the motor to activate the motor to move the camera relative to the shroud in the reciprocal translational movement,
   wherein a maximum displacement of the camera by the activation of the motor is defined as an amount of movement of the camera about both sides of the centerline.

2. The system of claim 1, wherein the control module receives the input from a user input device associated with a human-machine interface of the vehicle and outputs the one or more first control signals to the fluid system to activate the fluid system to dispense the cleaning fluid and simultaneously outputs the one or more second control signals to the motor to activate the motor to move the camera based on the input.

3. The system of claim 1, wherein the housing has a first end opposite a second end, and the first end is coupled to the coupling system and the shroud is fixedly coupled to the second end.

4. The system of claim 3, wherein the coupling system includes an annular plate having a pin, the annular plate coupled to an output shaft of the motor on a first side and the pin coupled to a second side of the annular plate, the second side opposite the first side.

5. The system of claim 4, wherein the first end of the housing includes a slot and the pin of the annular plate is received in the slot to couple the housing of the camera to the coupling system.

* * * * *